(12) United States Patent
Yang et al.

(10) Patent No.: US 11,695,232 B2
(45) Date of Patent: Jul. 4, 2023

(54) ADAPTER WITH AN ELASTIC COMPONENT

(71) Applicant: SUNCALL TECHNOLOGIES (SZ) CO., LTD, Shenzhen (CN)

(72) Inventors: Xiaotong Yang, Shenzhen (CN); Xiaohui Liu, Shenzhen (CN); Masaya Nakagawa, Shenzhen (CN)

(73) Assignee: Suncall Technologies (SZ) Co., Ltd, Shenzhen (CN)

( * ) Notice: Subject to any disclaimer, the term of this patent is extended or adjusted under 35 U.S.C. 154(b) by 0 days.

(21) Appl. No.: 17/278,199

(22) PCT Filed: Sep. 18, 2019

(86) PCT No.: PCT/CN2019/106313
§ 371 (c)(1),
(2) Date: Mar. 19, 2021

(87) PCT Pub. No.: WO2020/057525
PCT Pub. Date: Mar. 26, 2020

(65) Prior Publication Data
US 2021/0359455 A1    Nov. 18, 2021

(30) Foreign Application Priority Data
Sep. 21, 2018    (CN) .......................... 201811108946.4

(51) Int. Cl.
*H01R 13/453* (2006.01)
*H01R 13/502* (2006.01)
*H01R 31/06* (2006.01)

(52) U.S. Cl.
CPC ..... *H01R 13/4536* (2013.01); *H01R 13/5025* (2013.01); *H01R 31/06* (2013.01)

(58) Field of Classification Search
CPC .............. H01R 13/4538; H01R 13/518; H01R 13/4536; H01R 13/5025; H01R 31/06;
(Continued)

(56) References Cited

U.S. PATENT DOCUMENTS 3,990,758 A * 11/1976 Petterson ........... H01R 13/4536
439/138
5,317,663 A * 5/1994 Beard .................. G02B 6/3825
385/70
(Continued)

FOREIGN PATENT DOCUMENTS

CN        201781134 U        3/2011
CN        203930127 U        11/2014
(Continued)

OTHER PUBLICATIONS

International Search Report for Application No. PCT/CN2019/106313 dated Dec. 4, 2019.

*Primary Examiner* — Thanh Tam T Le
(74) *Attorney, Agent, or Firm* — KDW Firm PLLC

(57) ABSTRACT

Provided is an adapter. The adapter includes a housing and an elastic component. The elastic component is configured to connect the housing with an installation frame. The elastic component includes an installation body, a blocking portion and a clamping elastic piece, the blocking portion and the clamping elastic piece are disposed on the installation body. The installation body is configured to be detachably connected to the housing. A first clamping gap capable of accommodating the installation frame is provided between the blocking portion and the clamping elastic piece.

18 Claims, 9 Drawing Sheets

(58) Field of Classification Search
CPC .. G02B 6/3897; G02B 6/3825; G02B 6/3893; G02B 6/3821; G02B 6/3805
USPC ......... 439/140, 141, 534, 540.1; 385/53, 55, 385/56, 58, 60, 70
See application file for complete search history.

(56) References Cited

U.S. PATENT DOCUMENTS

| | | | | |
|---|---|---|---|---|
| 5,506,922 | A * | 4/1996 | Grois | G02B 6/3849 385/75 |
| 5,909,526 | A * | 6/1999 | Roth | G02B 6/3885 385/56 |
| 6,425,694 | B1 * | 7/2002 | Szilagyi | G02B 6/3849 385/139 |
| 6,471,412 | B1 * | 10/2002 | Belenkiy | G02B 6/3825 385/139 |
| 6,685,362 | B2 * | 2/2004 | Burkholder | G02B 6/3849 439/607.34 |
| 6,712,523 | B2 * | 3/2004 | Zimmel | G02B 6/266 385/72 |
| 6,715,928 | B1 * | 4/2004 | Matasek | G02B 6/3897 385/56 |
| 7,144,163 | B2 * | 12/2006 | Tanaka | G02B 6/3825 385/55 |
| 7,233,731 | B2 * | 6/2007 | Solheid | G02B 6/4471 385/135 |
| 7,264,401 | B2 * | 9/2007 | Johnson | G02B 6/3806 385/53 |
| 7,340,146 | B2 * | 3/2008 | Lampert | G02B 6/3849 385/139 |
| 7,384,200 | B2 * | 6/2008 | Nakagawa | G02B 6/3825 248/27.3 |
| 7,785,018 | B2 * | 8/2010 | Jones | G02B 6/3849 385/94 |
| 8,192,091 | B2 * | 6/2012 | Hsu | G02B 6/3825 385/55 |
| 8,794,851 | B2 * | 8/2014 | Jibiki | G02B 6/3825 385/75 |
| 9,134,486 | B2 * | 9/2015 | Tseng | G02B 6/3849 |
| 9,229,177 | B1 * | 1/2016 | Sato | G02B 6/4261 |
| 9,285,548 | B2 * | 3/2016 | Lin | G02B 6/3825 |
| 9,383,523 | B2 * | 7/2016 | Liu | G02B 6/3879 |
| 9,453,963 | B2 * | 9/2016 | Sato | G02B 6/241 |
| 9,470,849 | B2 * | 10/2016 | Wong | G02B 6/3825 |
| 9,494,746 | B2 * | 11/2016 | Sanders | G02B 6/3897 |
| 9,547,134 | B2 * | 1/2017 | Liu | G02B 6/3825 |
| 10,073,225 | B2 * | 9/2018 | Weiland | H01R 13/745 |
| 10,295,752 | B2 * | 5/2019 | Zhu | G02B 6/3825 |
| 10,424,863 | B1 * | 9/2019 | Zhuang | H01R 13/4532 |
| 10,439,346 | B2 | 10/2019 | He | |
| 10,502,903 | B1 * | 12/2019 | Wang | G02B 6/3825 |
| 10,502,904 | B2 * | 12/2019 | Yang | G02B 6/3825 |
| 10,700,479 | B1 * | 6/2020 | Smith | H01R 13/745 |
| 10,852,486 | B2 * | 12/2020 | Hsu | G02B 6/3865 |
| 11,054,582 | B2 * | 7/2021 | Yang | G02B 6/3897 |
| 11,262,510 | B2 * | 3/2022 | Wong | G02B 6/3897 |
| 2006/0169856 | A1 * | 8/2006 | Dorenkamp | G02B 6/3897 248/231.9 |
| 2015/0118874 | A1 | 4/2015 | Watanabe | |

FOREIGN PATENT DOCUMENTS

| | | |
|---|---|---|
| CN | 206041151 U | 3/2017 |
| CN | 206947619 U | 1/2018 |
| CN | 207037650 U | 2/2018 |
| CN | 207249188 U | 4/2018 |
| CN | 108832370 A | 11/2018 |
| CN | 208835347 U | 5/2019 |
| JP | 2012/226267 A | 11/2012 |

\* cited by examiner

ADAPTER WITH AN ELASTIC COMPONENT

CROSS-REFERENCE TO RELATED APPLICATION

This application is a U.S. National Stage Application of PCT Application Serial No. PCT/CN2019/106313, filed Sep. 18, 2019, which claims priority to Chinese Patent Application No. 201811108946.4 filed Sep. 21, 2018, the disclosures of which are incorporated herein by reference in their entireties.

TECHNICAL FIELD

The present disclosure relates to the technical field of optical communications, for example, an adapter.

BACKGROUND

An adapter is an interface converter, and the adapter may be an independent hardware interface device and allows hardware or an optical communication interface to be connected to other hardware or optical communication interfaces, or the adapter may also be an information interface. Common adapters include a power adapter and an optical fiber adapter.

The adapter needs to be installed on an installation frame through an elastic component and a blocking structure disposed on the own housing of the adapter. The installation frame is usually a hollow panel in a shape of a hollow square. The elastic component is installed on the housing of the adapter. The housing is fixedly provided with a blocking portion. The elastic component and the blocking portion form a clamping position. However, due to different stacking methods, the adapter usually has two structures. One is that blocking portions are disposed on the left and right sides of the housing of the adapter, and another is that the blocking portions are disposed on the upper and lower sides of the housing of the adapter. In this manner, two types of molds and production lines of the housing of the adapter are required, which greatly increases the production costs. Moreover, adapters of the same housing may be stacked only in an up-and-down direction or only in a left-and-right direction, and thus the application range is small.

SUMMARY

The present disclosure provides an adapter. The adapter includes a housing and an elastic component. The elastic component is configured to connect the housing with an installation frame. The elastic component includes an installation body, a blocking portion and a clamping elastic piece, the blocking portion and the clamping elastic piece are disposed on the installation body. The installation body is configured to be detachably connected to the housing. A first clamping gap capable of accommodating the installation frame is provided between the blocking portion and the clamping elastic piece.

Figure 1:
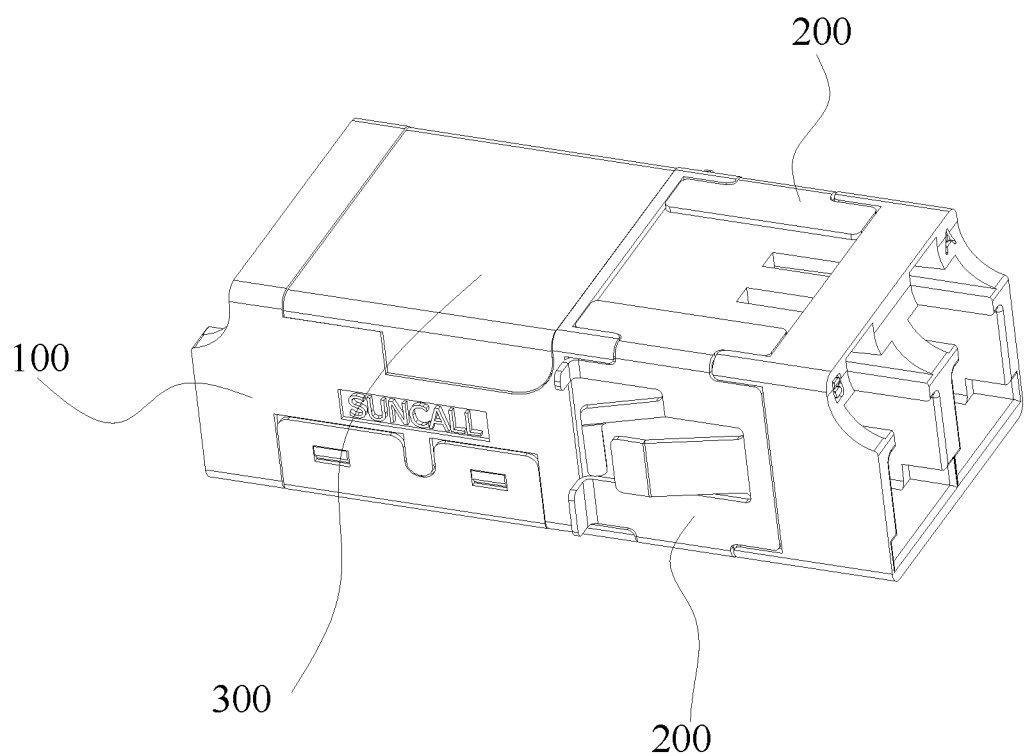
FIG. 1 is an axonometric drawing of an adapter provided with elastic components on left and right sides of a housing according to an embodiment of the present application.
Figure 2:
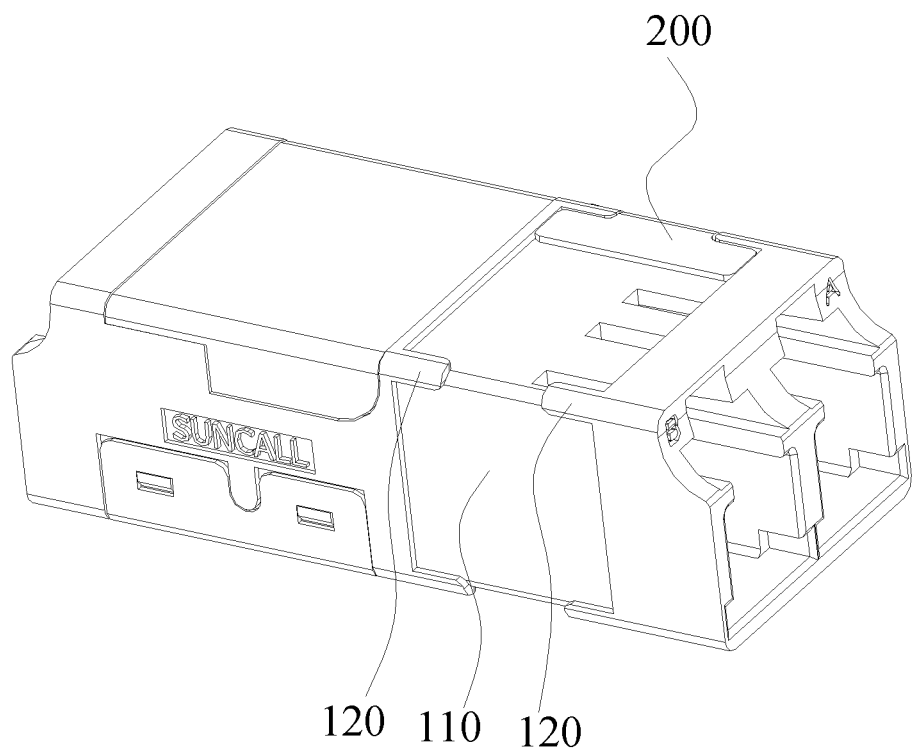
FIG. 2 is a schematic view of the structure of FIG. 1 with one elastic component removed.

REFERENCE LIST 100 housing
200 elastic component
300 door body
400 first shielding gate
500 second shielding gate
600 first elastic component
700 second elastic component
110 body accommodation groove
120 clamping portion
130 plugging cavity
140 plugging port
150 door body accommodation groove
160 second clamping portion
170 fourth clamping portion
131 maintenance port
132 insertion port
151 side plate accommodation groove
210 installation body
220 blocking portion
230 clamping elastic piece
240 first clamping gap
250 guiding elastic piece
260 connecting piece
270 clamping piece
211 body plate
212 clamping plate
213 connecting portion
214 second clamping gap
231 inclined piece
232 abutting piece 251 tilted piece
252 flat piece
310 reinforcing rib
311 first clamping protrusion
312 second clamping protrusion
313 main door plate
314 side door plate
315 third clamping portion
410 rotary shaft installation portion
420 shaft hole
430 guiding hole
440 first body
421 upper arc segment
422 lower arc segment
423 limiting arc segment
710 first elastic piece
720 second elastic piece
721 light-transmitting through hole

DETAILED DESCRIPTION

The solutions of the present disclosure are described hereinafter through embodiments in conjunction with drawings.

An embodiment of the present disclosure provides an adapter. As shown in FIGS. 1 to 3 and FIG. 5, the adapter includes a housing 100 and an elastic component 200. Generally, the housing 100 is roughly rectangular, but is not limited to a rectangular block shape. The elastic component 200 is configured to connect the housing 100 with an installation frame (not shown in the figure). The elastic component 200 includes an installation body 210, a blocking portion 220 and a clamping elastic piece 230, and the blocking portion 220 and the clamping elastic piece 230 are disposed on the installation body 210. The installation body 210 is detachably connected to the housing 100. A first clamping gap 240 capable of accommodating the installation frame is provided between the blocking portion 220 and the clamping elastic piece 230. The thickness of the first clamping gap 240 is equal to or slightly less than the thickness of a to-be-clamped part of the installation frame. The elastic component 200 may be an integrally formed piece, but is not limited to an integrally formed piece. That is, if the elastic component 200 is not an integrally formed piece, the blocking portion 220 may be elastic. To make the appearance more beautiful, the housing 100 is provided with a body accommodation groove 110 capable of accommodating the installation body 210, and the shape of the body accommodation groove 110 is adapted to the shape of the installation body 210.

In the adapter provided in this embodiment, the elastic component 200 is directly provided with a clamping position formed by the blocking portion 220 and the clamping elastic piece 230. When the upper and lower surfaces or the left and right surfaces of the housing 100 need to be connected to the installation frame, different (different specific structures and/or sizes) elastic components 200 may be directly selected and installed on the upper and lower surfaces or the left and right surfaces of the housing 100. Due to the low processing costs of the elastic component 200, the production costs of the adapter may be greatly reduced. Moreover, the same adapter may be stacked in an up-and-down direction or in a left-and-right direction, which has a wider application range.

The structure and the installation method of the installation body 210 are not limited. In an embodiment, as shown in FIGS. 1 to 4, two elastic components 200 are split structures, an installation body 210 of each of the two elastic components 200 includes a body plate 211 and clamping plates 212 that are perpendicular to the body plate 211, and the clamping plates 212 are disposed on two sides of the body plate 211, respectively. The body plate 211 and the two clamping plates 212 form a clamping structure capable of clamping the housing 100. The distance between the two clamping plates 212 may be equal to or slightly less than the thickness of a to-be-clamped part of the housing 100 between the two clamping plates 212 so that the housing 100 can be clamped tightly, that is, the installation body 210 is roughly a U-shaped elastic clamp. To facilitate the elastic deformation of the blocking portion 220 for clamping, the body plate 211 may also be U-shaped, and end portions of two side walls of the U-shaped body plate 211 are both bent upward (being upward means pointing away from the housing 100) to form the blocking portions 220.

Figure 5:
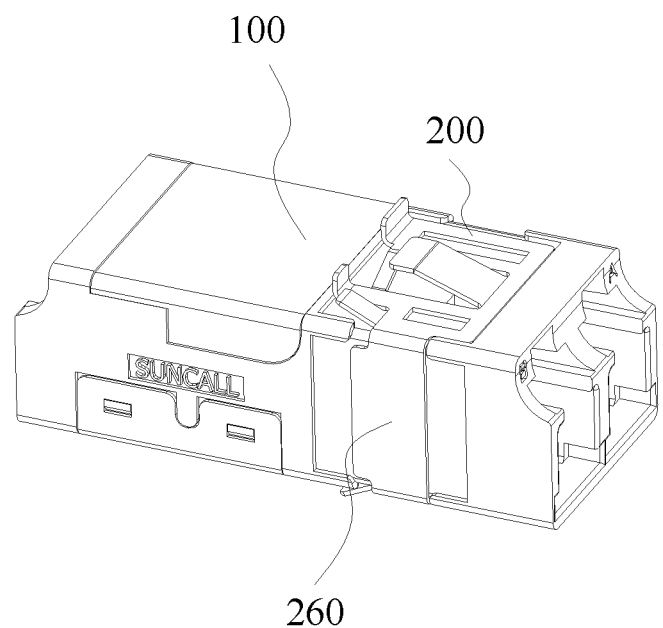
FIG. 5 is an axonometric drawing of the adapter provided with the elastic components on upper and lower sides of the housing according to an embodiment of the present application.
Figure 6:
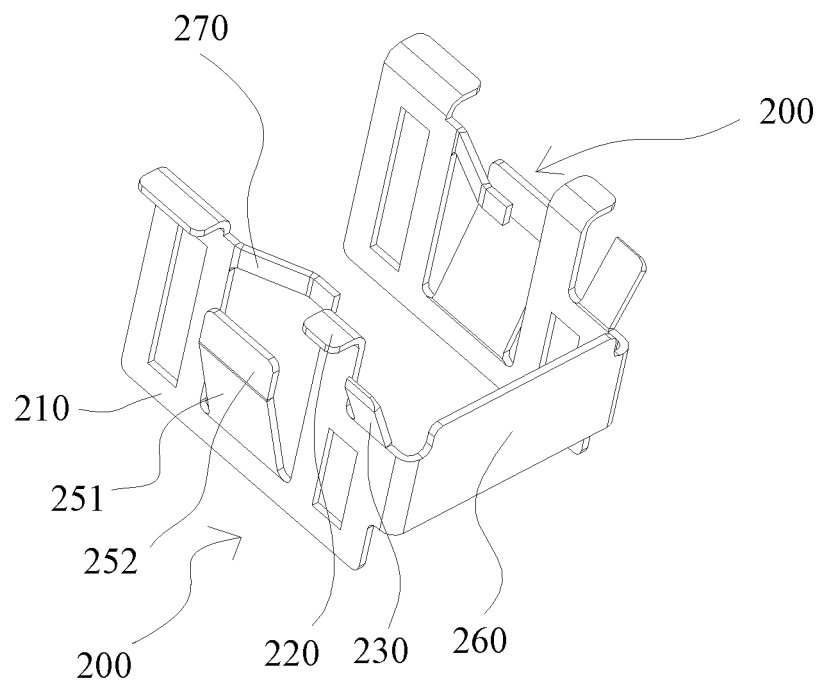
FIG. 6 is a structure view of a second elastic component according to an embodiment of the present application.

In another embodiment, as shown in FIGS. 5 and 6, two elastic components 200 may be an integrated structure. Each of two sides of the housing 100 is provided with an elastic component 200, the installation bodies 210 of the elastic components 200 on the two sides of the housing 100 are connected by a connecting piece 260, and the installation bodies 210 on two sides of the housing 100 form a clamping structure with the connecting piece 260. The distance between the two installation bodies 210 may be equal to or slightly less than the thickness of the to-be-clamped part of the housing 100 between the two installation bodies 210 so that the housing 100 can be clamped tightly. As shown in FIG. 6, the clamping structure formed by the installation bodies 210 of the elastic components 200 on the two sides of the housing 100 and the connecting piece 260 is roughly a U-shaped plate, but is not limited to a U-shaped plate. End portions of two side walls of the clamping structure are both bent upward (being upward means pointing away from the housing 100) to form blocking portions 220 of the elastic components 200 on the two sides of the housing 100.

Figure 3:
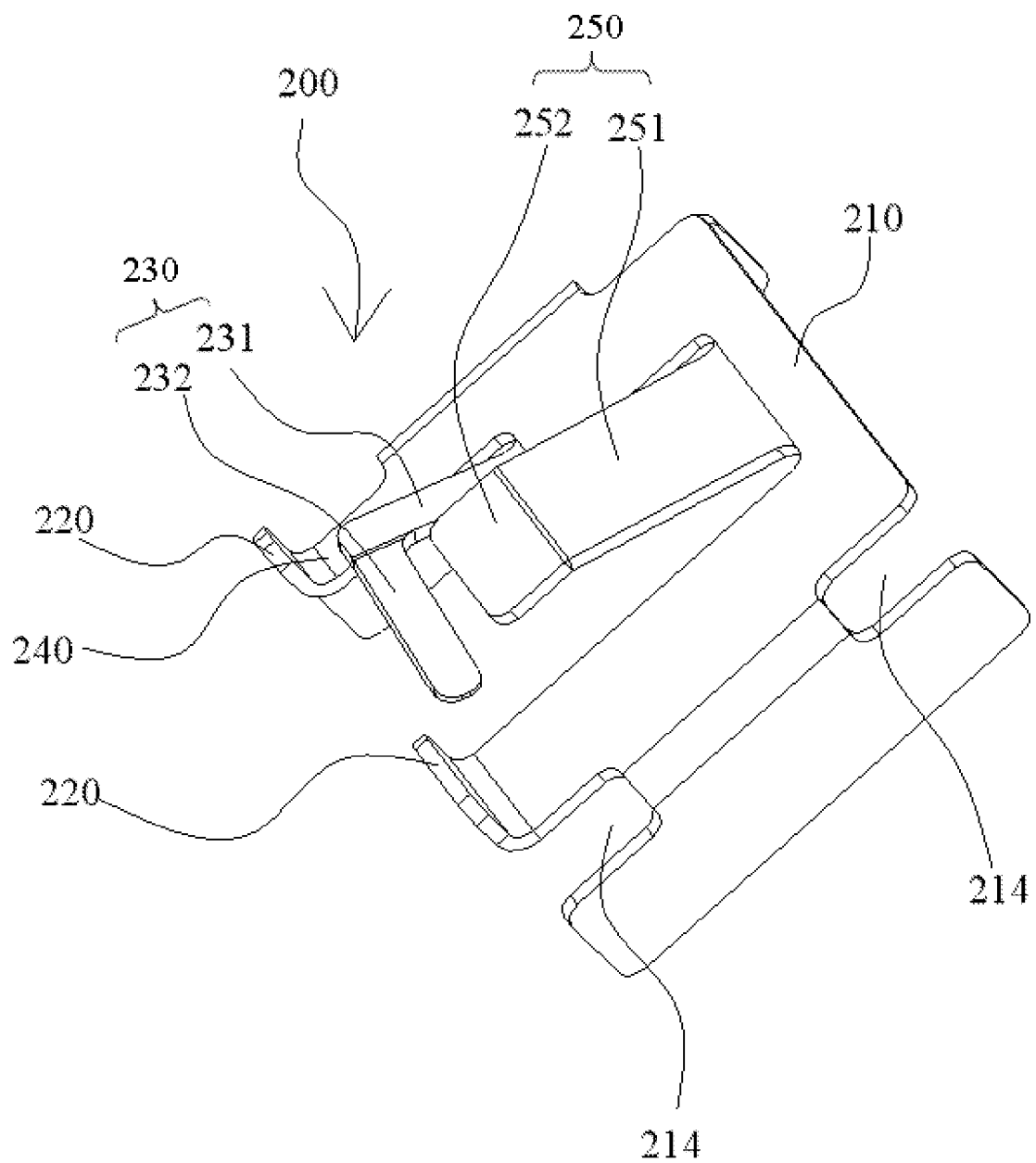
FIG. 3 is a first structure view of a first elastic component according to an embodiment of the present application.
Figure 4:
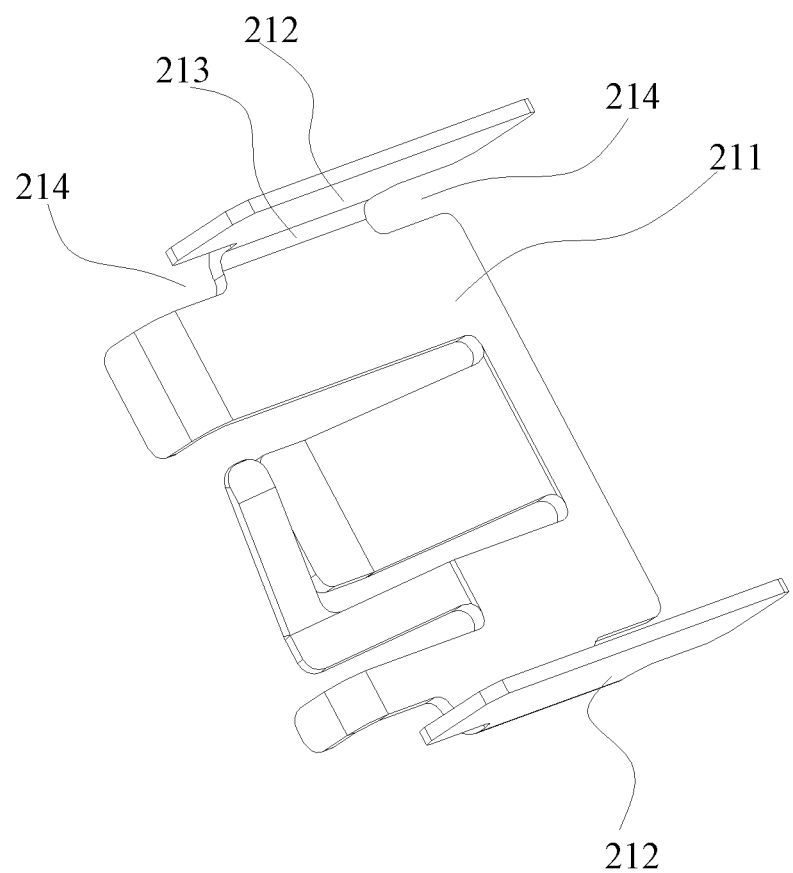
FIG. 4 is a second structure view of the first elastic component according to an embodiment of the present application.

With continued reference to FIGS. 3, 4, and 6, one end of the clamping elastic piece 230 may be connected to the installation body 210, but is not limited to being connected to the installation body 210, and another end of the clamping elastic piece 230 is suspended to facilitate the elastic deformation of the clamping elastic piece 230. For example, in FIGS. 3 and 4, one end of the clamping elastic piece 230 is connected to a groove wall of the U-shaped body plate 211; in FIG. 6, one end of the clamping elastic piece 230 is connected to a groove wall of the U-shaped installation body 210. As shown in FIGS. 3 and 4, the clamping elastic piece 230 includes an inclined piece 231 and an abutting piece 232. The inclined piece 231 is disposed obliquely relative to the body plate 211. Two ends of the inclined piece 231 are connected to the body plate 211 and the abutting piece 232, respectively. The abutting piece 232 is configured to abut against the blocking portion 220, that is, the clamping elastic piece 230 is roughly L-shaped. Of course, as shown in FIG. 6, the clamping elastic piece 230 is only an inclined elastic piece. It is to be understood that no matter whether two elastic components 200 are an integrated structure or split structures, the clamping elastic piece 230 shown in FIG. 3 or FIG. 6 may be used. As shown in FIG. 6, a clamping piece 270 inclined inward (that is, toward the to-be-clamped housing 100) may further be provided on the installation body 210, one end of the clamping piece 270 is connected to the installation body 210, and another end of the clamping piece 270 is suspended. In an embodiment, the clamping piece 270 includes a first tilted piece inclined inward and a first abutting piece connected to the first tilted piece, and the first abutting piece is configured to abut against the housing 100.

To facilitate the installation of the adapter on the installation frame, the elastic component 200 further includes a guiding elastic piece 250 disposed on the installation body 210. The guiding elastic piece 250 is located on one side of the clamping elastic piece 230 facing away from the blocking portion 220. The guiding elastic piece 250 includes a tilted piece 251 inclined toward the clamping elastic piece 230 and a flat piece 252 connected to a free end of the tilted piece 251. In an embodiment, the tilted piece 251 is connected to a groove bottom of the U-shaped body plate 211 as shown in FIGS. 3 and 4 or connected to a groove bottom of the U-shaped installation body 210 as shown in FIG. 6. The flat piece 252 is roughly parallel to the body plate 211, and the flat piece 252 is roughly flush with or slightly lower than a top portion of the clamping elastic piece 230. The tilted piece 251 may be elastically deformed and play a guiding role, which facilitates the insertion of the guiding elastic piece 250 into the installation frame.

With continued reference to FIGS. 3 and 4, to make the assembly between the installation body 210 and the elastic component 200 more stable, the clamping plate 212 and the body plate 211 are connected by a connecting portion 213. Two ends of the clamping plate 212 protrude from two ends of the connecting portion 213, respectively. A second clamping gap 214 is formed between each of the two ends of the clamping plate 212 and the body plate 211. Two clamping portions 120 are disposed at intervals at the junction of every two side walls of the housing 100, the connecting portion 213 is accommodated between the two clamping portions 120, and the clamping portion 120 may be clamped in the respective second clamping gap 214.

Figure 7:
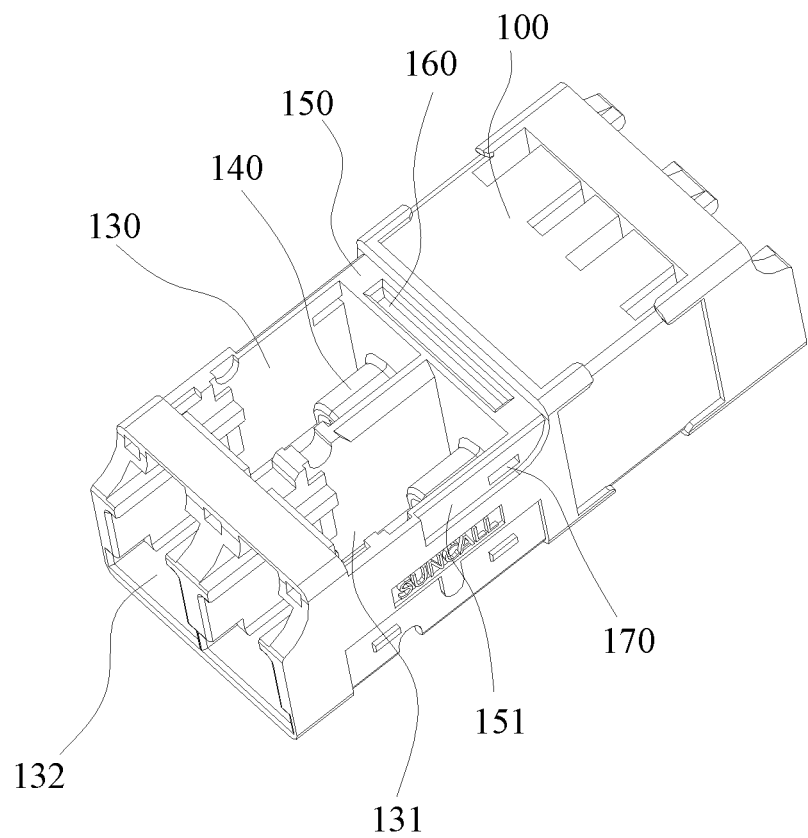
FIG. 7 is a first structure view of the adapter with a door body removed according to an embodiment of the present application.

As shown in FIG. 7, a plugging cavity 130 is provided in the housing 100, and a plugging port 140 capable of being connected to an external device is disposed in the plugging cavity 130. The plugging cavity 130 usually has at least two openings. At least one of the openings is a maintenance port 131 for inspection and cleaning in the plugging cavity 130, and at least one of the openings is an insertion port 132 into which an external joint is inserted such that the external joint is connected to the plugging port 140. The insertion port 132 is usually provided with a shielding gate connected to the housing 100 through a rotary shaft and an elastic component. The shielding gate is opened when the external joint is inserted, and is automatically closed under the action of the elastic component when the external joint is removed to prevent dust from falling onto a plugging joint. The insertion port 132 and the maintenance port 131 are usually configured to be perpendicular to each other.

Figure 8:
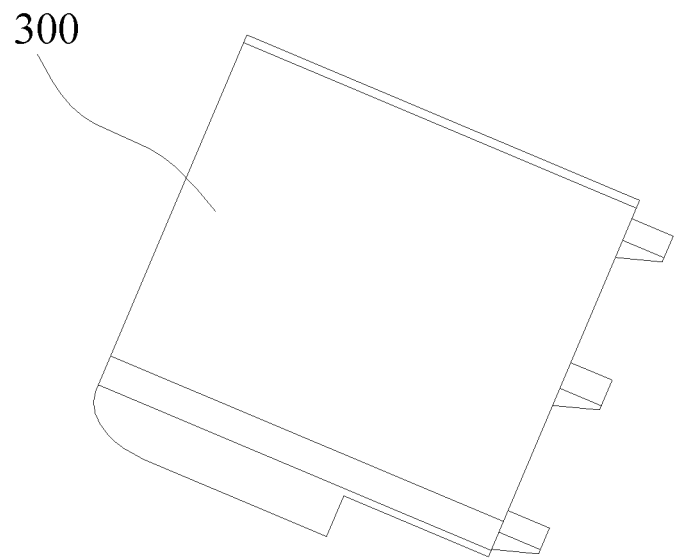
FIG. 8 is a first structure view of the door body according to an embodiment of the present application.
Figure 9:
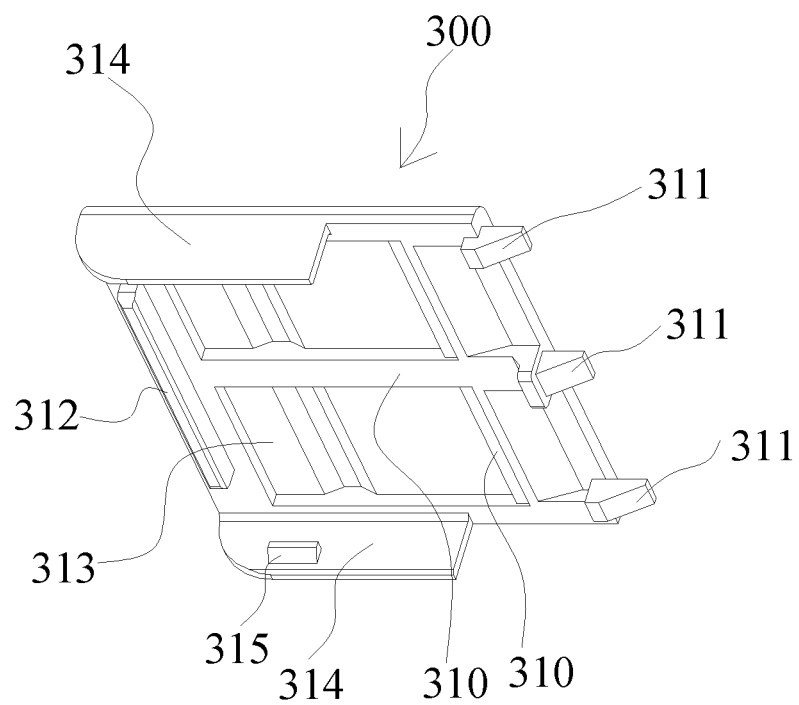
FIG. 9 is a second structure view of the door body according to an embodiment of the present application.

As shown in FIGS. 1, 8, and 9, the adapter provided in this embodiment further includes a door body 300, and the door body 300 is openable and disposed on the housing 100 to open or block the maintenance port 131. In this embodiment, the door body 300 is made of a plastic material, the door body 300 is clamped to the housing 100, and an inner wall of the door body 300 is provided with a reinforcing rib 310. In an embodiment, the reinforcing rib 310 includes a reinforcing rib 310 arranged longitudinally and a reinforcing rib 310 arranged horizontally. The door body 300 is made of a plastic material, which facilitates the coloring of the door body 300 so that the corresponding performance of the adapter may be determined by the color of the door body 300 and the housing 100. The door body 300 is clamped to the housing 100, which facilitates the disassembly and assembly of the door body 300. The reinforcing ribs 310 are disposed on the door body 300 so that the door body 300 meets the strength requirement while the thickness of the door body 300 is not increased. In an embodiment, the housing 100 is provided with a door body accommodation groove 150, and the door body accommodation groove 150 is configured to accommodate the door body 300. An inner contour of the door body accommodation groove 150 may be fitted with an outer contour of the door body 300 so that the appearance is beautiful.

The door body 300 is clamped to the housing 100 in the following manner: each of two ends of the door body 300 is provided with a first clamping portion, and the corresponding position of the housing 100 is provided with a second clamping portion 160 that is fitted with the first clamping portion. To avoid the unsightly appearance caused by the opening on the door body 300, the first clamping portion is a clamping protrusion, and the second clamping portion 160 is a clamping slot. It is to be noted that in other embodiments, the first clamping portion may be provided as a clamping slot, and the second clamping portion 160 may be provided as a clamping protrusion. One end of the door body 300 is provided with a first clamping protrusion 311, another end of the door body 300 is provided with a second clamping protrusion 312, and the clamping direction of the first clamping protrusion 311 is perpendicular to the clamping direction of the second clamping protrusion 312. In an embodiment, the extension direction of the first clamping protrusion 311 is consistent with the extension direction of the door body 300, and the extension direction of the second clamping protrusion 312 is perpendicular to the extension direction of the door body 300. The first clamping protrusion 311 is inserted into the corresponding clamping slot on the housing 100, and then the door body 300 is rotated until the second clamping protrusion 312 is clamped on the housing 100. Multiple first clamping protrusions 311 are provided, and at least one second clamping protrusion 312 is provided.

The first clamping protrusion 311 is usually wedge-shaped, but is not limited to a wedge shape. The second clamping protrusion 312 is usually long-strip-shaped such as rectangular, but is not limited to being long-strip-shaped such as rectangular.

As shown in FIG. 9, to further improve the assembly stability of the door body 300 and the housing 100, the door body 300 includes a main door plate 313 and side door plates 314 r disposed on two sides of the main door plate 313, respectively, each of two side door plates 314 is provided with a third clamping portion 315, and the corresponding position of the housing 100 is provided with a fourth clamping portion 170 that is fitted with the third clamping portion 315. The third clamping portion 315 is a clamping protrusion, and the fourth clamping portion 170 is a clamping slot. In an embodiment, the third clamping portion 315 is disposed on an inner wall of one side door plate 314. It is to be noted that in other embodiments, the third clamping portion 315 may be provided as a clamping slot, and the fourth clamping portion 170 may be provided as a clamping protrusion. To prevent the deformation of the door body 300, the housing 100 is provided with a supporting piece for supporting the main door plate 313.

As shown in FIG. 7, to make the side door plate 314 closely fitted with the housing 100 when the door body 300 is in a closed state, the door body accommodation groove 150 includes a side plate accommodation groove 151 configured to accommodate the side door plate 314, an outer contour of the side door plate 314 coincides with an inner contour of the side plate accommodation groove 151, and an outer contour of one end of the side door plate 314 adjacent to the second clamping protrusion 312 is arc-shaped. In an embodiment, the outer contour of one end of the side door plate 314 adjacent to the second clamping protrusion 312 is in a shape of a quarter arc.

Figure 10:
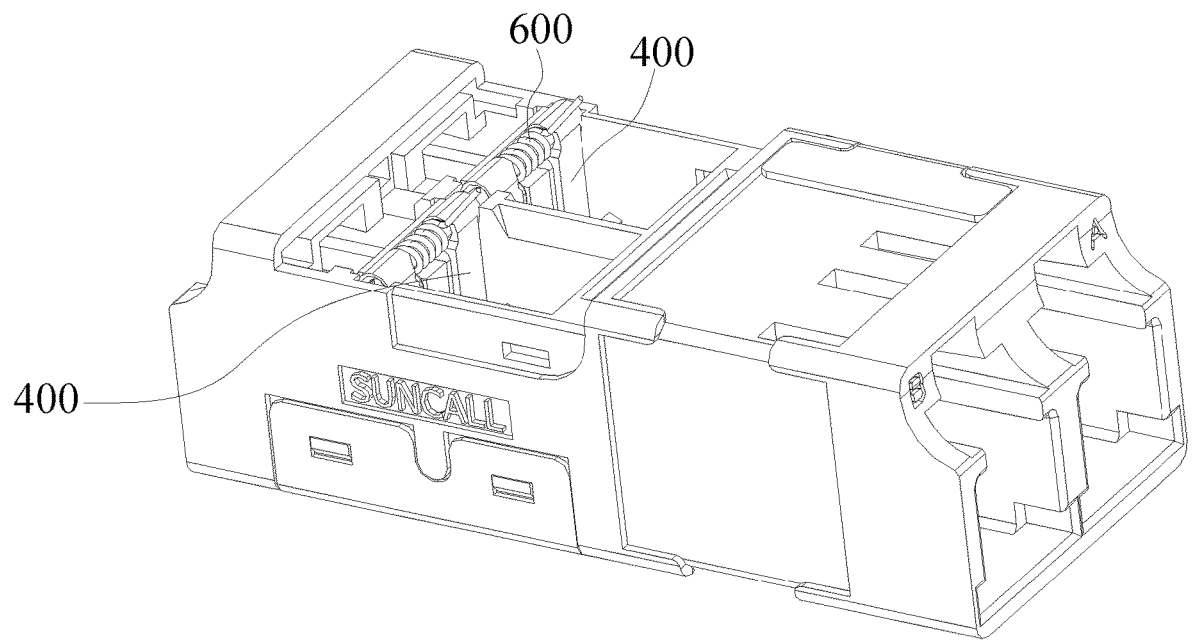
FIG. 10 is a second structure view of the adapter with the door body removed according to an embodiment of the present application.
Figure 11:
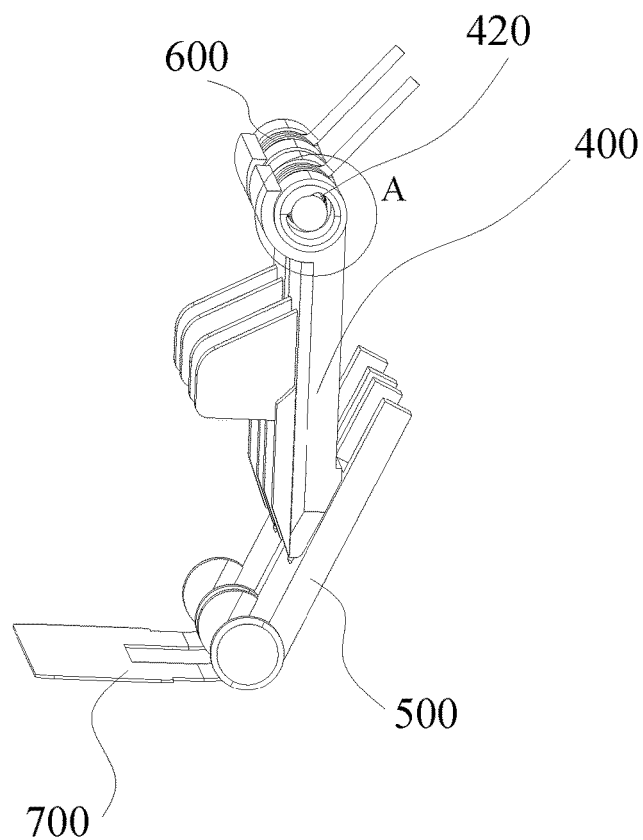
FIG. 11 is a first axonometric view of a first shielding gate and a second shielding gate in a closed state according to an embodiment of the present application.
Figure 13:
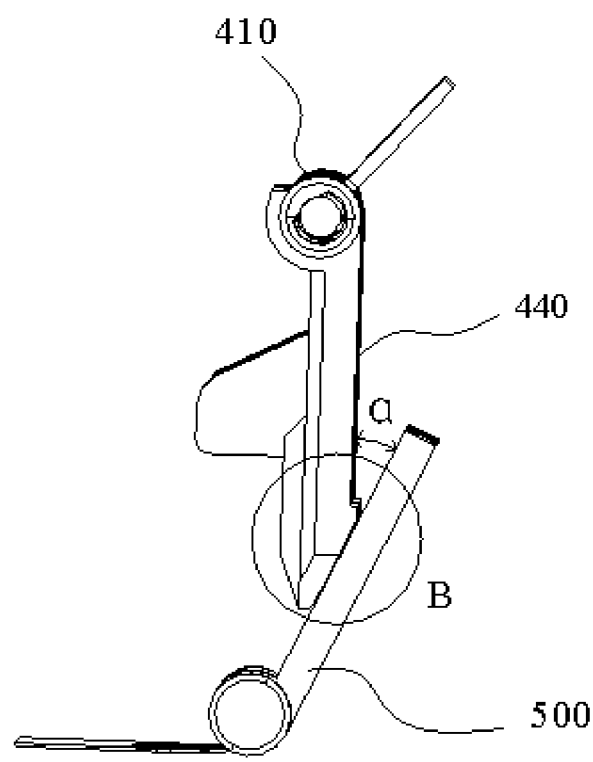
FIG. 13 is a side view of the first shielding gate and the second shielding gate in the closed state according to an embodiment of the present application.

As shown in FIGS. 10, 11, and 13, the insertion port 132 is provided with a first shielding gate 400, a second shielding gate 500, a first elastic component 600, and a second elastic component 700. The first shielding gate 400 and the second shielding gate 500 are rotatably disposed at the plugging cavity 130, and the first shielding gate 400 and the second shielding gate 500 can cooperate with each other to open or block the insertion port 132. The second shielding gate 500 abuts against the first shielding gate 400 when the second shielding gate 500 and the first shielding gate 400 are in a closed state, the second shielding gate 500 and the first shielding gate 400 are disposed at an included angle, and the second shielding gate 500 is inclined toward an inner side of the insertion port 132 relative to the first shielding gate 400. The first shielding gate 400 and the second shielding gate 500 are disposed up and down, and when the second shielding gate 500 and the first shielding gate 400 are in a closed state, a lower end of the first shielding gate 400 abuts against an upper end of the second shielding gate 500. The first elastic component 600 is configured to provide the first shielding gate 400 with an elastic force in the closed state, and the second elastic component 700 is configured to provide the second shielding gate 500 with an elastic force in the closed state. In an embodiment, the elastic force provided by the first elastic component 600 is greater than the elastic force provided by the second elastic component 700. Furthermore, similar to the related art, when the second shielding gate 500 and the first shielding gate 400 are in a closed state, the first shielding gate 400 is roughly perpendicular to the plugging port 140.

In this embodiment, two shielding gates are relatively inclined when the two shielding gates are in a closed state. Therefore, the angle and resilience by which one of the inclined shielding gates needs to be rotated are small, and it is easier to close the shielding gate. In this manner, the following problem can be avoided: two shielding gates in the related art are roughly in a vertical state (that is, the two shielding gates are roughly parallel to each other) and the second elastic component 700 is prone to failure so that the second shielding gate 500 is not tightly closed.

Figure 14:
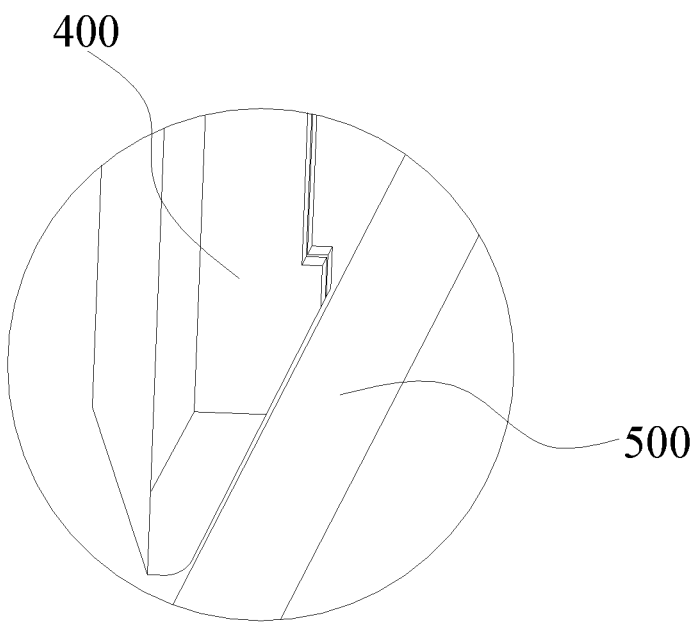
FIG. 14 is a partial enlarged view of a part B of FIG. 13.

As shown in FIG. 14, an end surface of the first shielding gate 400 configured to abut against the second shielding gate 500 is a plane inclined with respect to a first body 440 of the first shielding gate 400. An inclination angle of the plane determines an inclination angle of the second shielding gate 500, and the inclination angle of the inclined plane may be set according to specific requirements. In an embodiment, when the second shielding gate 500 and the first shielding gate 400 are in a closed state, the value range of an included angle α between the second shielding gate 500 and the first shielding gate 400 is 5° to 85°. For example, the included angle α may be 5°, 15°, 25°, 35°, 45°, 55°, 65°, 75°, or 85°.

Figure 15:
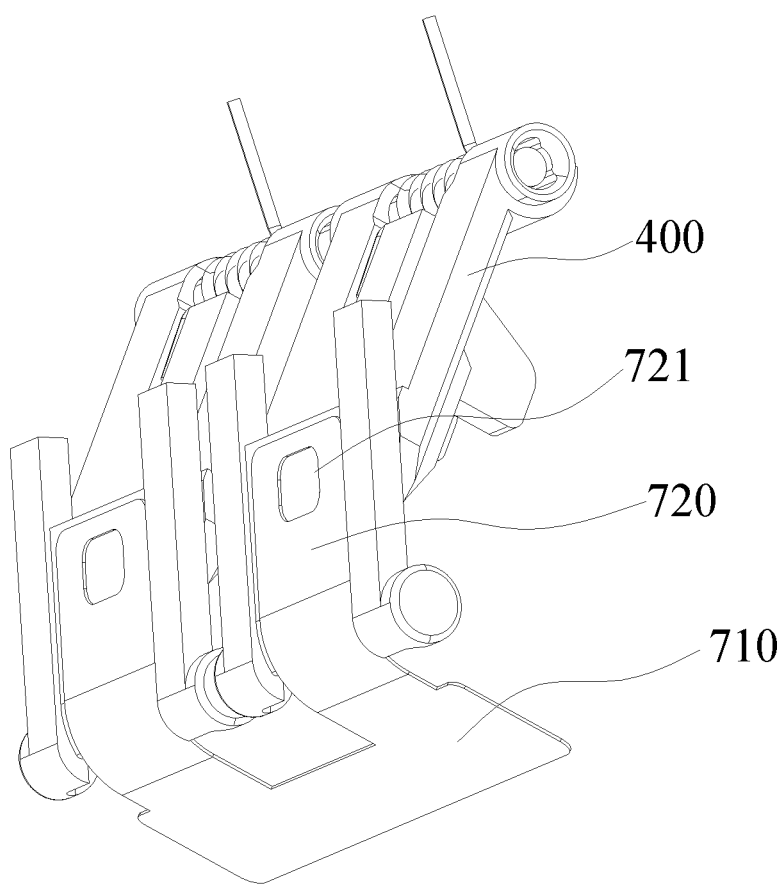
FIG. 15 is a second axonometric view of the first shielding gate and the second shielding gate in the closed state according to an embodiment of the present application.

As shown in FIG. 15, the second elastic component 700 is an elastic piece. The second elastic component 700 includes a first elastic piece 710 and a second elastic piece 720 that are disposed at an inclined angle and connected to each other. The first elastic piece 710 is connected to the housing 100, and the second elastic piece 720 is connected to an inner wall surface of the second shielding gate 500. The second elastic component 700 is provided as an elastic piece, the thickness occupied by the second elastic component 700 and the overall thickness of the housing 100 of the adapter can be reduced compared with the case where the second elastic component 700 is a torsion spring.

With continued reference to FIG. 15, the second elastic piece 720 is provided with a light-transmitting through hole 721, and the second shielding gate 500 is made of a plastic material. Due to the poor light transmittance of the metal material and the good light transmittance of the plastic material, whether there is light leakage from an insertion cavity is observed at the second shielding gate 500 corresponding to the light-transmitting through hole 721. In an embodiment, the second shielding gate 500 includes a second body and a protrusion disposed on the second body. The protrusion is clamped in the light-transmitting through hole 721 to strengthen the assembly stability of the second shielding gate 500 and the second elastic component 700.

Figure 12:
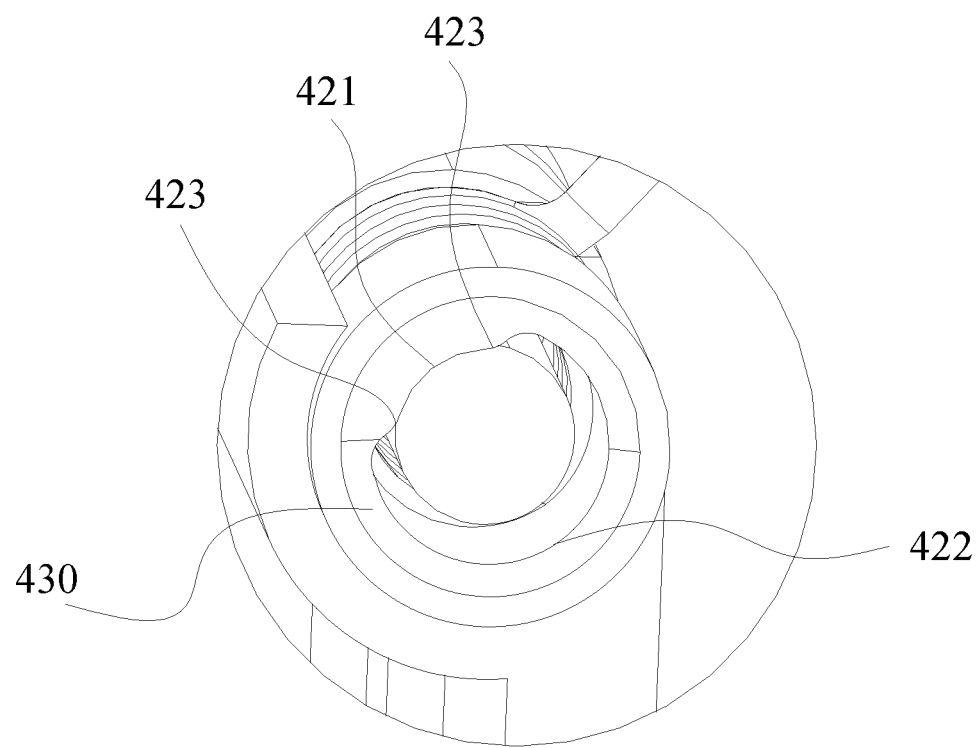
FIG. 12 is a partial enlarged view of a part A of FIG. 11.

The first shielding gate 400 is rotatably installed on the housing 100 through a rotary shaft. Generally, the inner diameter of a shaft hole 420 is slightly greater than the outer diameter of the rotary shaft, which causes the problem of difficult installation of the rotary shaft, the shaft hole 420 is provided for the rotary shaft passing through and disposed on the first shielding gate 400. To solve this problem, as shown in FIGS. 11 to 13, one end of the first body 440 of the first shielding gate 400 facing away from the second shielding gate 500 is provided with a rotary shaft installation portion 410, and the rotary shaft installation portion 410 is provided with a shaft hole 420 through which a rotary shaft passes. An edge of a longitudinal section of the shaft hole 420 includes an upper arc segment 421 and a lower arc segment 422 that protrude outward (outward or inward relative to an inside of the shaft hole 420), and the upper arc segment 421 and the lower arc segment 422 are connected by inwardly protruding limiting arc segments 423. The radius corresponding to the lower arc segment 422 is greater than the radius corresponding to the upper arc segment 421, and the rotary shaft is hung between the upper arc segment 421 and two limiting arc segments 423. The radius corresponding to the upper arc segment 421 is equal to or slightly greater than the outer diameter of the rotary shaft. With this arrangement of the shaft hole 420, the rotary shaft can be easily inserted on the first shielding gate 400. A central angle corresponding to the upper arc segment 421 determines a rotation angle of the first shielding gate relative to the rotary shaft, and the size of the upper arc segment 421 may be set according to specific rotation requirements. To further facilitate the installation of the shaft, an end portion of the rotary shaft installation portion 410 is provided with a guiding hole 430 in communication with the shaft hole 420, and the inner diameter of the guiding hole 430 gradually decreases from outside to inside.

Figure 16:
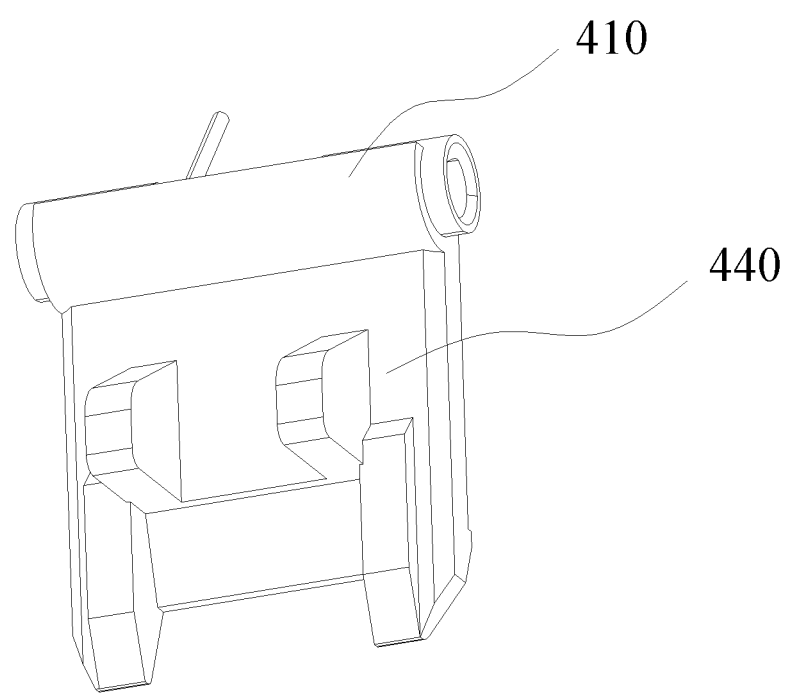
FIG. 16 is an axonometric view of the first shielding gate according to an embodiment of the present application.

To facilitate the installation of the first shielding gate 400 into the plugging cavity 130, as shown in FIG. 16, two sides of the first body 440 may be contracted inward with respect to two sides of the rotary shaft installation portion 410, respectively, that is, the size is reduced relative to a shielding gate body. As shown in FIG. 11, two sides of one end of the first shielding gate 400 adjacent to the second shielding gate 500 are inclined outward in a direction facing away from the second shielding gate 500.

Embodiments of the present disclosure provide an adapter with low production costs and a wide application range. The adapter includes a housing and an elastic component. The elastic component is provided with a clamping position formed by a blocking portion and a clamping elastic piece. When the upper and lower sides or the left and right sides of the housing need to be connected to an installation frame, different sizes of elastic components may be chosen to be installed on the upper and lower sides or the left and right sides of the housing. Due to the low processing costs of the elastic component, the production costs of the adapter may be greatly reduced. Moreover, the same adapter may be stacked in an up-and-down direction or in a left-and-right direction, which has a wider application range.

What is claimed is:

1. An adapter comprising:
a housing;
an elastic component configured to connect the housing with an installation frame and comprising:
an installation body configured for detachable connection to the housing;
a blocking portion integratedly disposed on the installation body; and
a clamping elastic piece disposed on the installation body;
wherein a first clamping gap for accommodating the installation frame is between the blocking portion and the clamping elastic piece;
a first elastic component configured to provide a first shielding gate with an elastic force in a closed state; and
a second elastic component configured to provide a second shielding gate with an elastic force in the closed state, the second elastic component being an elastic piece and comprising a first elastic piece and a second elastic piece, wherein:
the first elastic piece and the second elastic piece are disposed at an inclined angle and connected to each other;
the first elastic piece is connected to the housing;
the second elastic piece is connected to an inner wall surface of the second shielding gate; and
the second elastic piece comprises a light-transmitting through hole.

2. The adapter of claim 1, wherein one end of the clamping elastic piece is connected to the installation body and another end of the clamping elastic piece is suspended.

3. The adapter of claim 2, wherein:
the clamping elastic piece comprises an inclined piece and an abutting piece; and
two ends of the inclined piece are connected to the installation body and the abutting piece, respectively.

4. The adapter of claim 1, wherein:
the elastic component further comprises a guiding elastic piece disposed on the installation body;
the guiding elastic piece is located on one side of the clamping elastic piece facing away from the blocking portion; and
the guiding elastic piece comprises a tilted piece inclined toward the clamping elastic piece and a flat piece connected to a free end of the tilted piece.

5. The adapter of claim 1, wherein:
two sides of the housing are provided with elastic components, respectively;
installation bodies of the elastic components on the two sides of the housing are connected by a connecting piece; and
the installation bodies of the elastic components on the two sides of the housing form a clamping structure with the connecting piece.

6. The adapter of claim 1, wherein:
the installation body comprises a body plate and clamping plates perpendicular to the body plate;
the clamping plates are disposed on two sides of the body plate, respectively; and
the body plate forms a clamping structure with two clamping plates.

7. The adapter of claim 6, wherein:
each of the clamping plates is connected to the body plate by a connecting portion;
two ends of the each of the clamping plates protrude from two ends of the connecting portion, respectively;
a second clamping gap is formed between each of the two ends of the each of the clamping plates and the body plate;
two clamping portions are disposed at intervals at a junction of every two side walls of the housing; and
each clamping portion is clamped in a respective second clamping gap.

8. The adapter of claim 1, wherein the housing comprises a body accommodation groove capable of accommodating the installation body.

9. The adapter of claim 1, wherein the elastic component is an integrally formed piece.

10. The adapter of claim 1, wherein:
a plugging port capable of being connected to an external device is disposed in the plugging cavity; and
the plugging cavity has a maintenance port.

11. The adapter of claim 1, comprising a door body clamped to the housing, wherein the housing comprises a door body accommodation groove configured to accommodate the door body, and wherein an inner wall of the door body comprises a reinforcing rib.

12. The adapter of claim 11, wherein:
each of two ends of the door body comprises a first clamping portion; and
a corresponding position of the housing comprises a second clamping portion fitted with the first clamping portion.

13. The adapter of claim 11, wherein one end of the door body comprises a first clamping protrusion, another end of the door body comprises a second clamping protrusion, and a clamping direction of the first clamping protrusion is perpendicular to a clamping direction of the second clamping protrusion.

14. The adapter of claim 11, wherein:
the door body comprises a main door plate and side door plates;
the side door plates are disposed on two sides of the main door plate, respectively;
each of two side door plates comprises a third clamping portion; and
a corresponding position of the housing comprises a fourth clamping portion fitted with the third clamping portion.

15. The adapter of claim 1, wherein:
one end of a first body of the first shielding gate facing away from the second shielding gate comprises a rotary shaft installation portion;
the rotary shaft installation portion comprises a shaft hole for a rotary shaft passing through;
an edge of a longitudinal section of the shaft hole comprises an upper arc segment and a lower arc segment that protrude outward; and
the upper arc segment and the lower arc segment are connected by an inwardly protruding limiting arc segment.

16. The adapter of claim 15, wherein:
an end portion of the rotary shaft installation portion comprises a guiding hole in communication with the shaft hole; and an inner diameter of the guiding hole gradually decreases from outside to inside.

17. An adapter comprising:
a housing comprising a plugging cavity;
an elastic component configured to connect the housing with an installation frame and comprising:
 an installation body configured for detachable connection to the housing;
 a blocking portion integratedly disposed on the installation body; and
 a clamping elastic piece disposed on the installation body;
 wherein a first clamping gap for accommodating the installation frame is between the blocking portion and the clamping elastic piece;
a first elastic component configured to provide a first shielding gate with an elastic force in a closed state; and
a second elastic component configured to provide a second shielding gate with an elastic force in the closed state, the second elastic component being an elastic piece and comprising a first elastic piece and a second elastic piece, wherein:
 the first elastic piece and the second elastic piece are disposed at an inclined angle and connected to each other;
 the first elastic piece is connected to the housing;
 the second elastic piece is connected to an inner wall surface of the second shielding gate; and
 the second elastic piece comprises a light-transmitting through hole; and
a door body clamped to the housing;
wherein an inner wall of the door body comprises a reinforcing rib; and
wherein one end of the door body comprises a first clamping protrusion, another end of the door body comprises a second clamping protrusion, and a clamping direction of the first clamping protrusion is perpendicular to a clamping direction of the second clamping protrusion.

18. The adapter of claim 17, wherein one end of the clamping elastic piece is connected to the installation body and another end of the clamping elastic piece is suspended.

* * * * *